J. H. KUEHNER.
ATTACHABLE RUNNER FOR WHEEL VEHICLES.
APPLICATION FILED JAN. 29, 1912.
1,044,789.
Patented Nov. 19, 1912.
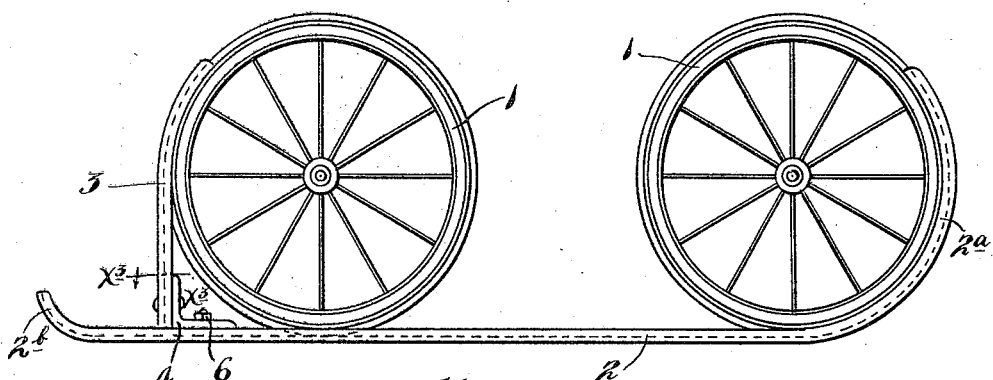
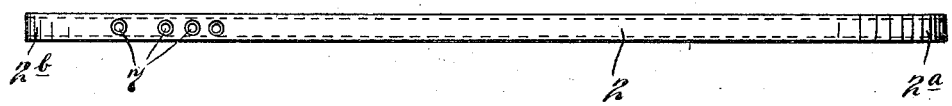
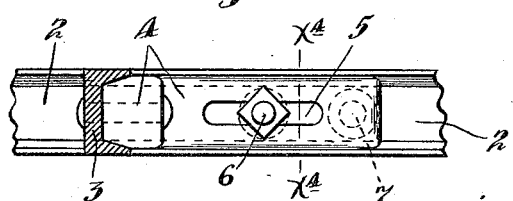
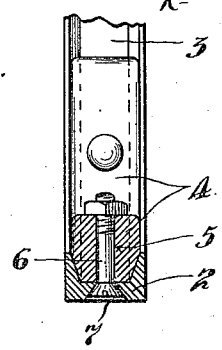
Witnesses.
H. L. Opsahl.
Geo. Knutson.
Inventor:
John H. Kuehner.
By his Attorneys.
Williamson & Merchant
COLUMBIA PLANOGRAPH CO., WASHINGTON, D. C.

UNITED STATES PATENT OFFICE.

JOHN H. KUEHNER, OF ST. PAUL, MINNESOTA.

ATTACHABLE RUNNER FOR WHEEL-VEHICLES.

1,044,789.  Specification of Letters Patent.  Patented Nov. 19, 1912.

Application filed January 29, 1912.  Serial No. 673,963.

*To all whom it may concern:*

Be it known that I, JOHN H. KUEHNER, a citizen of the United States, residing at St. Paul, in the county of Ramsey and State of Minnesota, have invented certain new and useful Improvements in Attachable Runners for Wheel-Vehicles; and I do hereby declare the following to be a full, clear, and exact description of the invention, such as will enable others skilled in the art to which it appertains to make and use the same.

My invention has for its particular object to provide an extremely simple and highly efficient runner for baby carriages, go-carts, and similar wheel vehicles, and to such ends, the invention consists of the novel devices and combinations of devices hereinafter described and defined in the claim.

Hitherto, detachable runners for baby carriages or go-carts have been provided and so constructed and arranged that the runner may be sprung onto and off from the wheels of the carriage, and when applied to the wheels, will be held in position solely by the spring action and form of the runner itself. In these prior detachable runners, no means of adjustment has been provided except the spring action in the runner itself, and this spring action does not provide for much variation in the space between the wheels, and when sprung excessively, the bottom of the runner is necessarily bent out of shape.

My invention provides a detachable runner which will be held to the wheels solely by its spring action and form and without the use of auxiliary attaching devices; and which has a large range of adjustments so that it may be set for proper coöperation with wheels varying greatly in their spacing or wheel base.

The invention is illustrated in the accompanying drawings wherein like characters indicate like parts throughout the several views.

Referring to the drawings, Figure 1 is a side elevation showing the improved runner applied to the wheels of a baby carriage or similar vehicle; Fig. 2 is a bottom plan view of the runner; Fig. 3 is a fragmentary view in section on the line $x^3$ $x^3$ on Fig. 1; and Fig. 4 is a vertical section taken on the line $x^4$ $x^4$ on Fig. 3.

The numeral 1 indicates the wheels of a wheel vehicle such as a baby carriage or go-cart, the running gear not being shown. The runner is constructed from a long metal channel bar 2, the front end of which is upwardly curved at $2^a$, so as to embrace the front wheel to a point considerably above the horizontal plane of its axis. The rear end of the runner 2 is extended considerably to the rear of the rear wheel and its extreme rear end is preferably slightly curved upward at $2^b$.

For engagement with the rear portion of the rear wheel, I provide an upright channel bar 3, the upper end of which is curved so that its channel engages the rear wheel to a point above the horizontal plane of the axis thereof. At its lower end, the bar 3 is rigidly secured to the upturned flange of an L-shaped bracket 4, the horizontal lower leg of which fits within the channel of the runner 2 and is provided with a slot 5. By means of a short nut-equipped bolt 6 passed through the runner, through the slot 5 of the bracket 4, the bar 3 is secured to said runner with freedom for such adjustments longitudinally thereof as is permitted by the said slot. To provide for still greater adjustments of the said bar 3 longitudinally of the runner, I provide the runner with a multiplicity of perforations 7 through any one of which the bolt 6 is adapted to be passed.

With the runner arranged as described, the wheels fit in the channel of the runner and of the adjustable clamping bar 3, and the said bar 3 will be secured to the runner in such position that the runner may be properly sprung onto the wheels of the particular vehicle to which the runner is to be applied. The upturned front end $2^a$ of the runner which engages the front wheel at a point very considerably above the horizontal plane of the axis of the said wheel, because when the weight of the vehicle is thrown onto the rearwardly extended end $2^b$ of the runner, there is a considerable tendency to throw the runner off from the front wheel. The adjustable clamping bar 3, however, need not be extended as high up on the rear wheel as the front end thereof is extended on the front wheel. By extending the runner considerably at the rear of the rear wheel, a longer runner is provided which gives greater stability to the carriage when used as a sled and which removes the danger of a vehicle, such as a baby carriage or go-cart, from being tipped over backward, which is an action very likely to occur when the runner terminates at the rear wheel.

The above described runner is of small cost, is efficient for the purposes had in view, may be very easily applied and removed, and has a large range of adjustment to adapt it to wheels of different vehicles.

What I claim is:

A runner for wheel vehicles comprising a channel-shaped metal bar having a curved upper end for engagement with the front wheel, and provided with an upwardly curved rear end with a multiplicity of perforations forward of said curved rear end, an angle bracket fitting the channel of said channel bar and having a longitudinal slot in its lower leg, a nut-equipped bolt engageable through any of the perforations of said channel bar and through the slot of said angle bracket, and an upright channel-shaped clamping bar rigidly secured to the upper leg of said angle bracket and having a curved upper end for engagement with the rear wheel, substantially as described.

In testimony whereof I affix my signature in presence of two witnesses.

JOHN H. KUEHNER.

Witnesses:
F. D. MERCHANT,
HARRY D. KILGORE.

---

Copies of this patent may be obtained for five cents each, by addressing the "Commissioner of Patents, Washington, D. C."